(12) United States Patent
Ma et al.

(10) Patent No.: US 10,133,777 B2
(45) Date of Patent: Nov. 20, 2018

(54) ELIMINATING REDUNDANCY WHEN GENERATING INTERMEDIATE REPRESENTATION CODE

(71) Applicant: Sybase, Inc., Dublin, CA (US)

(72) Inventors: Xiaobin Ma, Dublin, CA (US); Xun Cheng, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 355 days.

(21) Appl. No.: 14/971,742

(22) Filed: Dec. 16, 2015

(65) Prior Publication Data

US 2017/0177664 A1   Jun. 22, 2017

(51) Int. Cl.
*G06F 17/00* (2006.01)
*G06F 17/30* (2006.01)
*G06F 8/30* (2018.01)
*G06F 8/41* (2018.01)

(52) U.S. Cl.
CPC .......... *G06F 17/30463* (2013.01); *G06F 8/30* (2013.01); *G06F 8/315* (2013.01); *G06F 8/43* (2013.01)

(58) Field of Classification Search
CPC .. G06F 11/2033; G06F 11/1076; G06F 17/18; G06F 17/30091; G06F 17/3012
See application file for complete search history.

(56) References Cited

U.S. PATENT DOCUMENTS

2005/0065910 A1 *   3/2005   Welton .............. G06F 17/30333

* cited by examiner

*Primary Examiner* — Truong V Vo
(74) *Attorney, Agent, or Firm* — Sterne, Kessler, Goldstein & Fox P.L.L.C.

(57) ABSTRACT

Disclosed herein are system, method, and computer program product embodiments for eliminating redundancy when generating intermediate representation code. An embodiment operates by traversing a query execution plan, and for at least one operator in the query execution plan, determining whether the operator is derived from a parent class operator. If it is determined that the operator is derived from the parent class operator, source code for the native access plan is generated using one or more code generator functions corresponding to the parent class operator and/or one or more generator functions specifically corresponding to the child class operator. If it is determined that the operator is not derived from the parent class operator, source code for the native access plan is generated using one or more code generator functions corresponding to the operator.

17 Claims, 5 Drawing Sheets

ELIMINATING REDUNDANCY WHEN GENERATING INTERMEDIATE REPRESENTATION CODE

BACKGROUND

Generally, a database management system may generate an intermediate representation code from a native access plan corresponding to a query execution plan when processing a database query. Often, a query execution plan includes operators that inherit properties from other operators. However, some intermediate representation languages (such as that used by a Low-Level Virtual Machine (LLVM)) are not object-oriented and do not support the concept of inherency. Thus, database systems that generate a native access plan using a query execution plan may generate redundant information and duplicate program code, which can require both extra data storage and generating the same program code multiple times. The redundant and information and duplicate code can dramatically degrade the code quality, increase development complexity, and increase the maintenance burden.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for eliminating redundancy when generating intermediate representation code.

Figure 1:
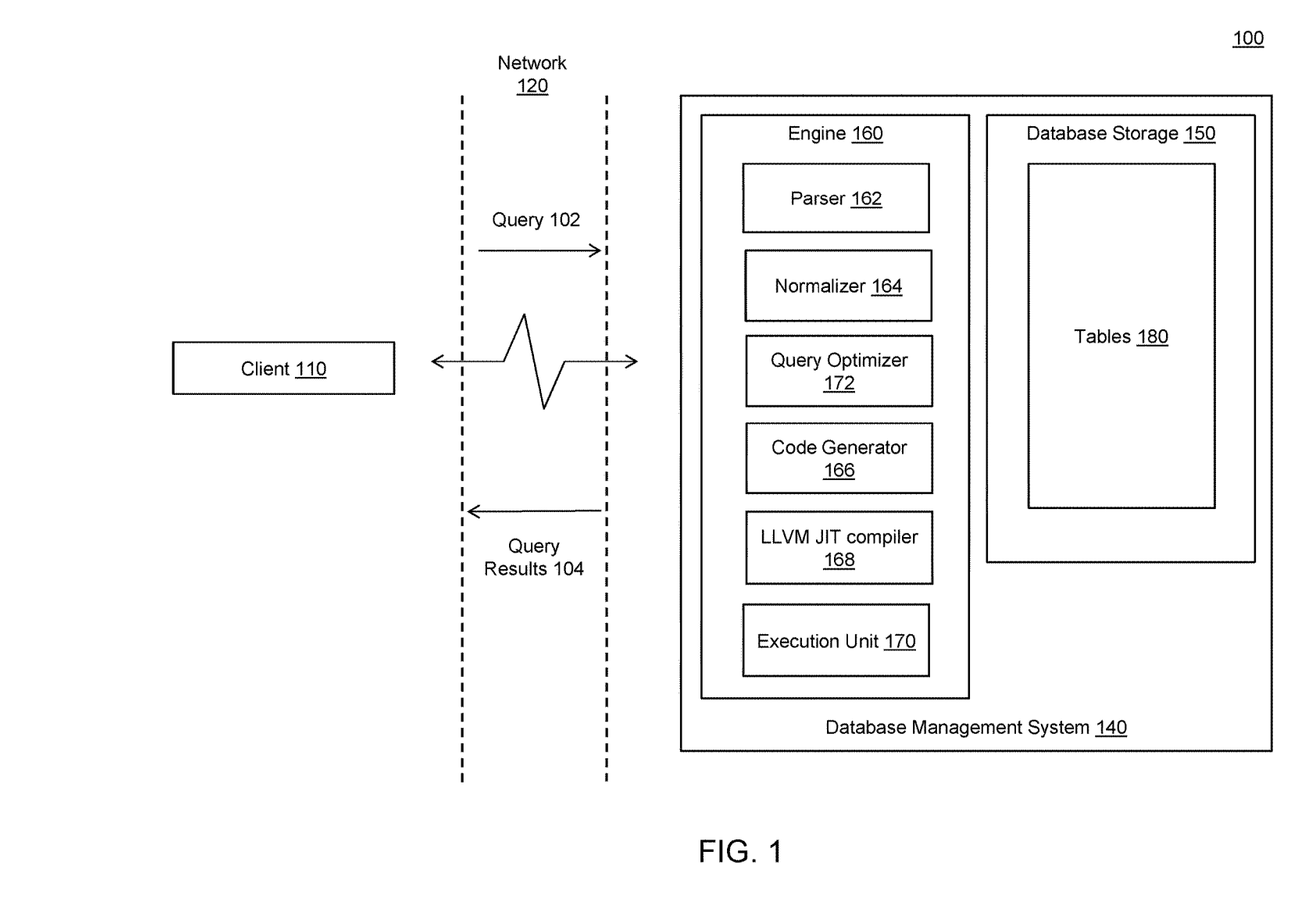
FIG. 1 is a block diagram of a database system for eliminating redundancy when generating intermediate representation code, according to an example embodiment.

FIG. 1 is a block diagram of a database system 100 for eliminating redundancy when generating intermediate representation code, according to an example embodiment. Database system 100 includes a database management system (DBMS) 140 and client 110 that communicates with DBMS 140. DBMS 140 can be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. Client 110 can request access to DBMS 140. Additionally, both client 110 and DBMS 140 can execute within a computer system, such as an example computer system discussed in FIG. 5.

Client 110 and DBMS 140 can communicate over network 120. Network 120 can be any wired and/or wireless network or combination of wired and/or wireless networks that can carry data communications. Such a network 120 can include, but is not limited to, a wired and/or wireless local area network, metropolitan area network, and/or wide area network that includes the Internet.

A relational database is a collection of data items organized as a set of formally-described tables from which data can be accessed or reassembled in many different ways without having to reorganize the database tables. A relational database employs a set of tables containing data fitted into predefined categories.

In an embodiment, the rows and/or columns are stored in one or more of tables 180. Any combination of the rows and/or columns of tables 180 can be stored compressed or uncompressed in tables 180. That data in tables 180 can be compressed using row compression, page-dictionary compression, page-index compression, column compression, or any combination thereof. Compressed rows and/or columns of tables 180 can each be compressed with different compression types. The rows and/or columns of table 180 can be stored in memory.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but can be another query language, such as SQL Script (a scripting language for describing application specific calculations inside the database), a MultiDimensional eXpressions (MDX), WIPE (weakly structure information processing and exploration) for data graph processing and FOX (for planning applications), to give a few examples. DBMS 140 is able to interpret query 102 in accordance with the query language and, based on the interpretation, generate requests to database storage 150.

Query 102 can be generated by a user using client 110 or by an application executing on client 110. Upon receipt, DBMS 140 begins to process query 102. Once processed, the result of the processed query is transmitted to client 110 as query result 104.

In an embodiment, query 102 includes one or more sub-queries. A sub-query is a query included within another query. Any sub-query may comprise one or more sub-queries.

In an embodiment, to process query 102, DBMS 140 may include engine 160, which may include a parser 162, a normalizer 164, a code generator 166, an Low-Level Virtual Machine (LLVM) Just-in-Time (JIT) compiler 168, an execution unit 170, a query optimizer 172, or any combination thereof.

Parser 162 parses the received queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to query optimizer 172. Query optimizer 172 analyzes the query and determines a query plan for executing the query. The query plan retrieves and manipulates information in the database storage 150 in accordance with the query semantics. This can include choosing the access method for each table accessed, choosing the order in which to perform a join operation on the tables, and choosing the join method to be used in each join operation. As there can be multiple strategies for executing a given query using combinations of these operations, query optimizer 172 generates and evaluates a number of strategies from which to select the best strategy to execute the query.

In an embodiment, query optimizer 172 generates multiple query plans. Once generated, query optimizer 172 selects a query plan from the multiple query plans to execute the query. The selected query plan may be a cost efficient plan, a query plan that uses the least amount of memory in DBMS 140, a query plan that executes the quickest, or any combination of the above, to give a few examples. In an embodiment, the selected query plan may be the query plan that invokes the least Input/Output accesses, which may be executed the fastest, particularly when the Input/Output accesses involve compression and decompression operations.

After processing the query plan, query optimizer 172 forwards the processed query plan to code generator 166. Code generator 166 compiles the processed query plan into source code of a native access plan. The compilation process determines how query 102 is executed by DBMS 140. LLVM JIT compiler unit 168 converts the source code of the native access plan generated by code generator 166 into intermediate representation code and native executable binary code. Execution unit 170 receives the native executable binary code and executes it to produce query results 104.

In an embodiment, LLVM JIT compiler unit 168 converts the source code of the native access plan generated by code generator 166 into intermediate representation code and native executable binary code. Intermediate representation code can be used to generate object or machine code in a machine-readable format for a target machine. Intermediate representation code can be run using an interpreter or compiled using a compiler, such as a Just-In-Time (JIT) compiler, into native code. In an embodiment, LLVM JIT compiler 168 converts the native access plan into a Low-Level Virtual Machine (LLVM) intermediate representation. For example, LLVM JIT compiler 168 can generate intermediate representation code in accordance with the method depicted in FIGS. 2 and 4.

Figure 2:
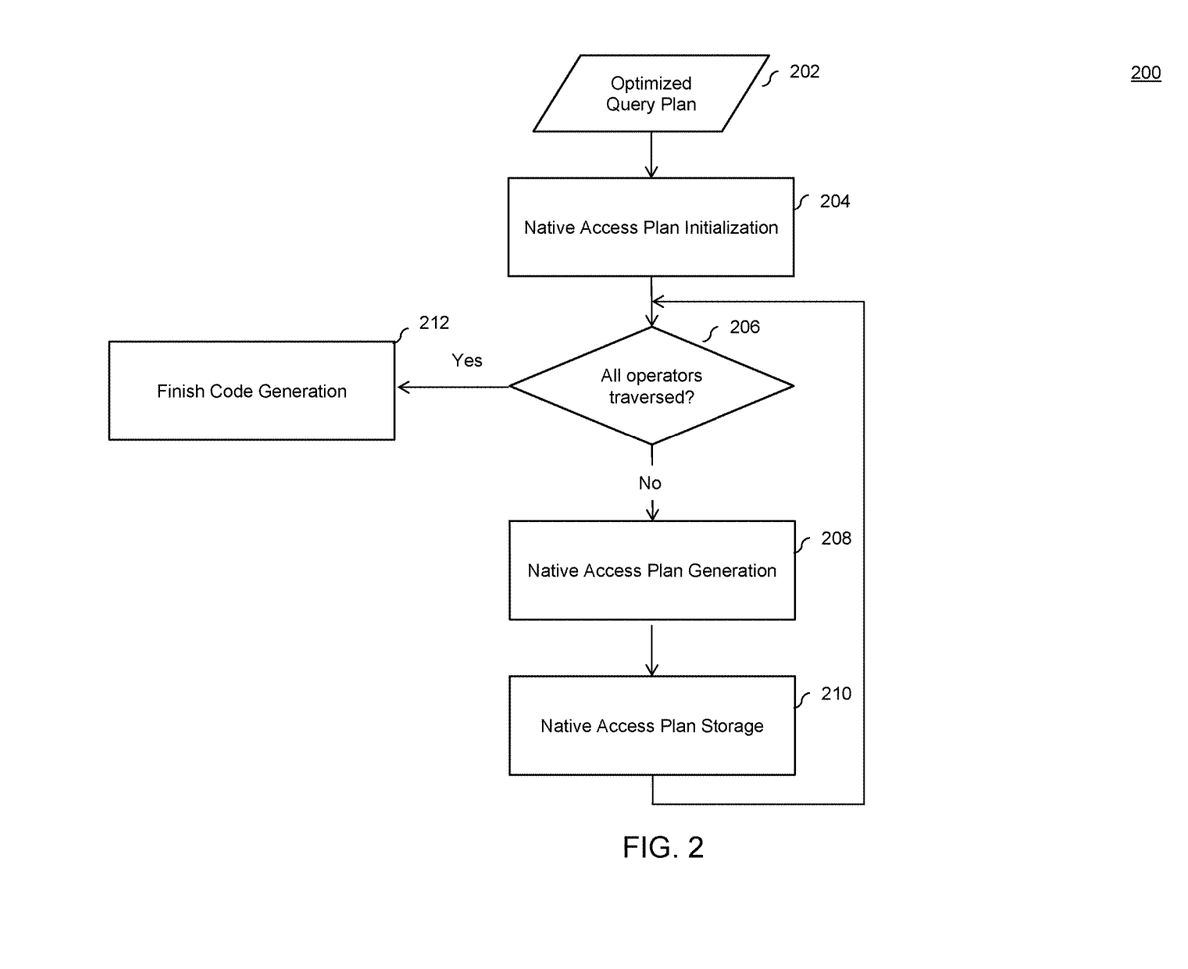
FIG. 2 is a flowchart illustrating a process for generating a native access plan, according to an example embodiment.

FIG. 2 is a flowchart for a method 200 for generating a native access plan, according to an embodiment. Method 200 can be performed by processing logic that can comprise hardware (e.g., circuitry, dedicated logic, programmable logic, microcode, etc.), software (e.g., instructions executing on a processing device), or a combination thereof.

At block 202, code generator 166 receives a query plan. In an embodiment, the received query plan comprises trees built of operators. Each operator may implement the same application program interfaces (APIs)—for example, Acquire, Open, Next, Close and Release, to name a few. Further, the query plan may be a consumer-driven model—i.e. the query plan is driven by its top-most operator.

At block 204, code generator 166 performs initializations to prepare for native access plan generation. According to an embodiment, these initializations may comprise generating an native access plan module for a compiled native access plan, generating a function signature for a compiled native access plan, generating blocks for a native access plan, generating structure types and constants used by code generator 166, retrieving and storing variables, and/or any combination thereof.

At block 206, code generator 166 traverses operators in the trees of the query plan. Code generator 166 may generate the source code of the native access plan for the operators of the query plan as detailed at block 208. In an embodiment, block 206 determines whether all of the operators of the query plan have been traversed and/or processed. If it is determined that all of the operators have been traversed, method 200 proceeds to block 212.

In an embodiment, code generator 166 traverses the trees of the query plan from a root node and generates the native access plan based upon the traversal.

At block 208, code generator 166 generates the native access plan based upon the operators of the query plan. In an embodiment, code generator 166 generates the source code of the native access plan in a bottom-up post order. For example, when code generator 166 traverses a Nested Loop Join (NLJ) in the query execution plan, code generator 166 first generates source code of the native access plan for the left child of the NLJ, then the right child of the NLJ, and then the parent of the NLJ. In this example, the source code of the native access plan is first produced for the child operators before generating the source code of the native access plan for the parent operator. The native access plan for the parent operator may be generated by calling or consuming the source code of the native access plan of the child operators. Code generator 166 may repeat this bottom-up post order of source code of the native access plan until all operators of the query plan have been traversed.

According to an embodiment, when an operator of the query plan is traversed, code generator 166 can generate source code of the native access plan based upon the operator traversed according to a member function. For example, for each operator in the query plan, there may be a set of functions that source code of the native access plan based on the functionalities of the operator according to a member function. This set of functions and member function may be stored in a class.

Figure 4:
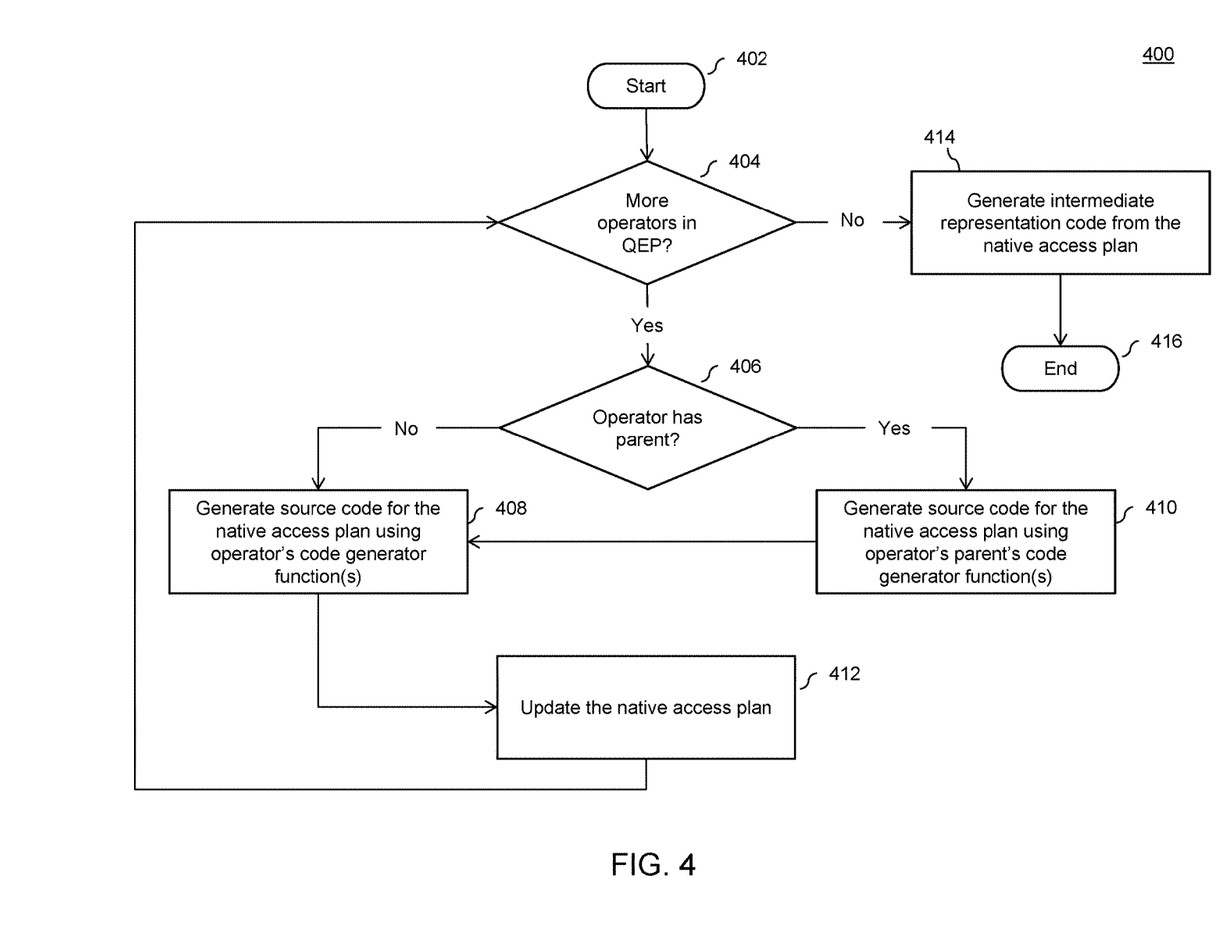
FIG. 4 is a flowchart illustrating a process for eliminating redundancy when generating intermediate representation code, according to an example embodiment.

In an embodiment, code generator 166 generates the code based on the operators according to the method 400 described regarding FIG. 4.

At block 210, after code generator 166 has generated source code of the native access plan for an operator, the source code of the native access plan may be placed in blocks generated during initialization, according to an embodiment. In an embodiment, these blocks are placed in vectors.

In an embodiment, after the source code of the native access plan has been generated for a child operator, the source code of the native access plan is placed in a temporary storage. When generating source code of the native access plan for the child's parent operator, the source code of the native access plan from the child operator is recalled and stored in a block generated during initialization.

According to an embodiment, once source code of the native access plan has been generated for a parent operator, the source code of the native access plan generated from the parent's child operator may be removed from temporary storage.

At block 212, code generator 166 finishes the code generation by placing generated source code into the native access plan. In an embodiment, after code generator 166 has finished generating source code of the native access plan for some or all parent operators, blocks comprising source code of the native access plan generated from a parent's child operator may be removed from a vector containing a block comprising source code of the native access plan generated from the parent operator.

Figure 3:
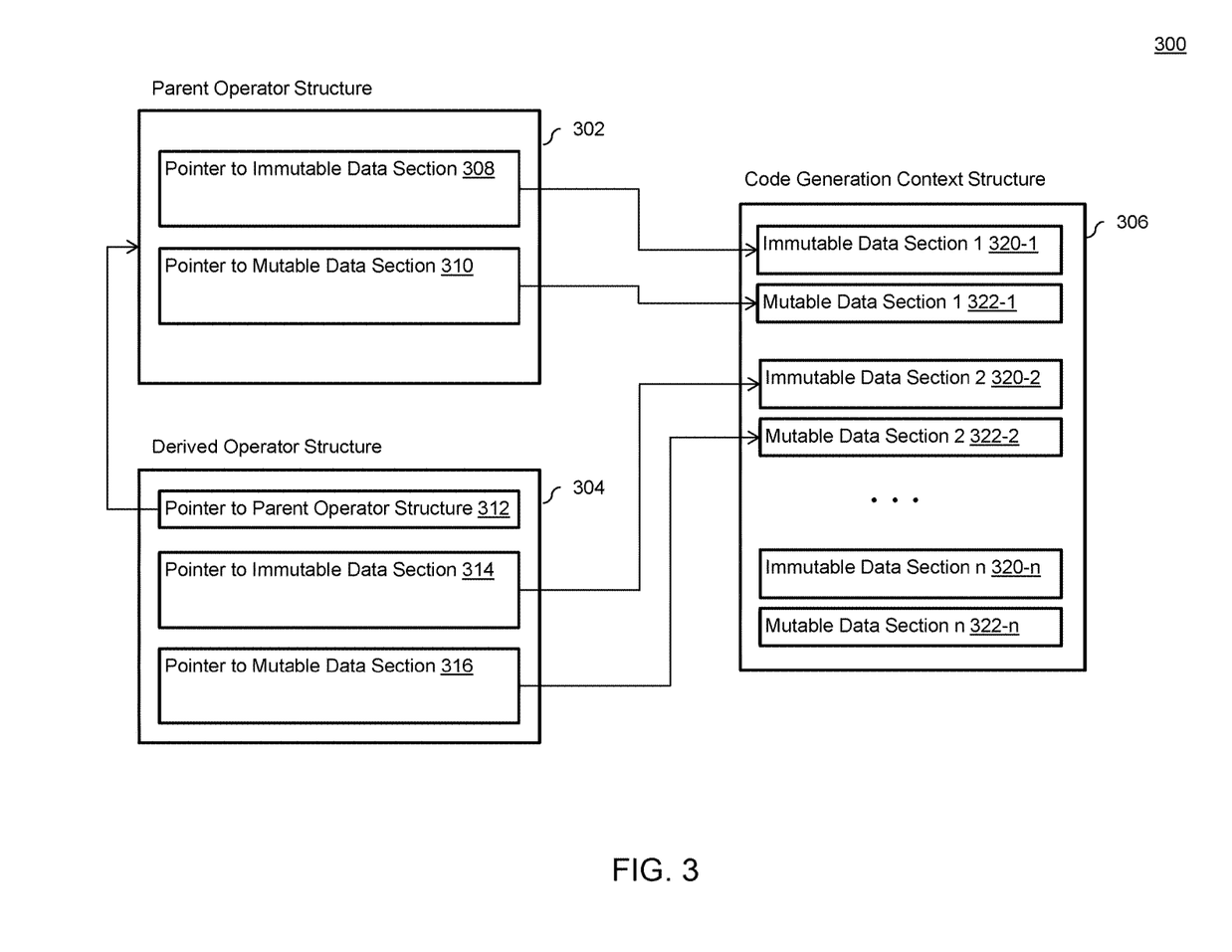
FIG. 3 is a block diagram illustrating an example data structure configuration, according to an example embodiment.

In the example of FIG. 3, parent operator structure 302 includes a pointer 308 to an immutable data structure and a pointer 310 to a mutable data structure. Alternatively or additionally, parent operator structure 302 can include an immutable data structure, a mutable data structure, and/or any combination thereof. In an embodiment, compiler 166 generates parent operator structure 302.

In the example of FIG. 3, derived operator structure 304 includes a pointer 312 to a parent operator structure, a pointer 314 to an immutable data structure, and a pointer 316 to a mutable data structure. Alternatively or additionally, derived operator structure 304 can include an immutable data structure, a mutable data structure, and/or any combination thereof.

In an embodiment, compiler 166 generates derived operator structure 304. Compiler 166 generates derived operator structure 304 so that the first part of the structure is a pointer 312 to the parent operator structure 302. Having the first part of the structure be pointer 312 means that the derived operator structure can handled as the parent operator structure by casting the derived operator structure as the parent operator structure. In this manner, the derived operator structure can be used to call a code generation function of a parent operator. Compiler 166 or intermediate representation code generation unit 168 can allocate memory for the instantiation of derived operator structure 304.

In the example of FIG. 3, code generation context structure includes immutable data sections 1-n (generally 320) and mutable data sections 1-n (generally 322). Immutable data refers data that cannot be changed in the code generation context structure and at run-time of the query execution. In an embodiment, immutable data includes a virtual address of an operator, a child index of an operator, a parent index of an operator, a value indicating whether the operator is unique, and/or any combination thereof. Any combination of immutable data can be turned into one or more constants, such as in intermediate representation code. Mutable data refers to data that can be changed in the code generation context structure. In an embodiment, mutable data includes one or more code generation functions corresponding to an operator.

In an embodiment, compiler 166 generates code generation context structure 306. For example, when traversing operators of a query execution plan, if the operator is a derived class, compiler 166 generates for the operator the immutable data 320-2 and mutable data 322-2 for the derived class and initializes the immutable and mutable pointers 314 and 316 with the newly generated data in the code generation context structure 306. If the operator is parent class, compiler 166 determines if the operator's structure's pointers to immutable or mutable data have been initialized to a non-null value. If they have, compiler 166 will not create its own mutable or immutable data because it has already been generated. Otherwise, compiler 166 generates for the operator the immutable data 320-1 and mutable data 322-1 for the parent class and initializes the immutable and mutable pointers 308 and 310 with the newly generated data in the code generation context structure 306.

Figure 5:
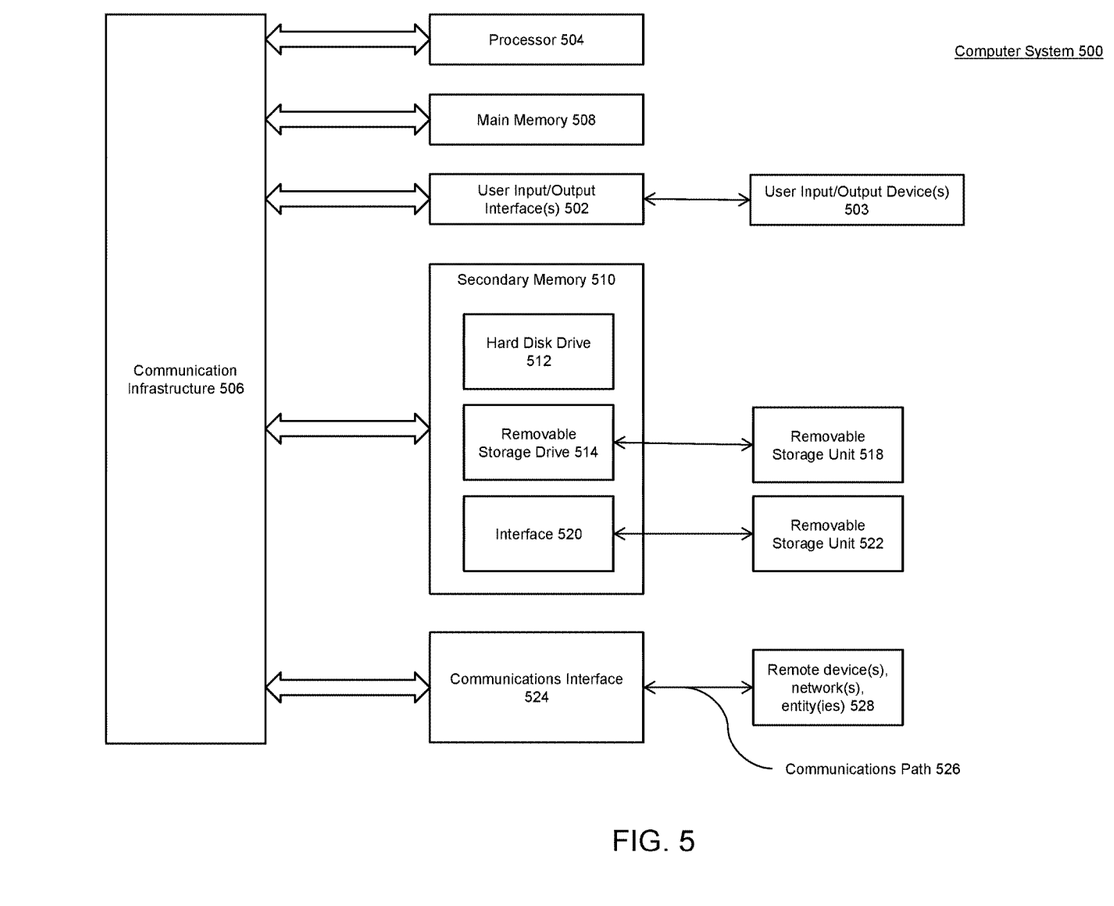
FIG. 5 is an example computer system useful for implementing various embodiments.

FIG. 4 is a flowchart for a method 400 for eliminating redundancy when generating intermediate representation code, according to an embodiment. Method 400 can be performed by processing logic that can comprise hardware (e.g., circuitry, dedicated logic, programmable logic, microcode, etc.), software (e.g., instructions executing on a processing device), or a combination thereof. In an embodiment, method 400 is performed by compiler 166 and/or intermediate representation code generator unit 168, which can be implemented by a computer system such as computer system 500.

Method 400 begins at block 402 and proceeds to block 404.

At block 404, it is determined whether there are operators left to process in a query execution plan. In an embodiment, compiler determines whether there are operators left to process in a query execution plan. In an embodiment, it is determined that there are no operators left to process in the query execution plan when (1) all of the operators have been processed by complier 166; (2) selected operators have been processed by complier 166; or (3) any combination or sub-combination thereof. Method 400 can proceed to block 406 if it is determined that there are operators left to process in the query execution plan. Otherwise, method 400 proceeds to block 416.

At block 406, it is determined whether the operator is derived from a parent class operator. In an embodiment, compiler 166 determines whether the operator is derived from a parent class operator. In an embodiment, complier 166 makes this determination by inspecting an operator structure (e.g. structures 302 or 304) to see if the operator structure includes a pointer 312 to a parent operator structure. Alternatively or additionally, the operator structure can have a flag or data field that indicates whether it is derived from another operator class, which can be inspected to determine whether the operator is derived from a parent class operator. If the operator does not have a parent, method 400 proceeds to block 408. Otherwise, method 400 proceeds to block 410.

At block 408, source code for the native access plan is generated using one or more code generator functions corresponding to the operator. In an embodiment, complier 166 generates source code for the native access plan using one or more code generator functions corresponding to the operator. These one or more code generator functions can be stored, for example, in code generation context structure 306 and can be accessed, for example, using pointers 308 and/or 310.

In an embodiment, generating source code for the native access plan using one or more code generator functions corresponding to the operator further includes determining that one or more code generator functions of a child class operator of the operator has already generated some source code for the native access plan for the operator. If so, additional source code for the native access plan for the operator can be generated that (1) has not already been generated by the one or more code generator functions of the child class operator and (2) corresponds to the operator.

At block 410, source code for the native access plan is generated using one or more code generator functions corresponding to the parent class operator. In an embodiment, complier 166 generates source code for the native access plan using one or more code generator functions corresponding to the parent class operator. These one or more code generator functions can be stored, for example, in code generation context structure 306 and can be accessed, for example, via parent operator structure 302 using pointer 312. Using this approach, a change to the one or more code generator functions corresponding to the parent class operator may not be required by one or more code generator functions of a child class operator. Further, this approach avoids duplicating the definition of common elements of parent and derived classes, which minimizes maintenance effort. After block 410, method 400 proceeds to block 408 to generate source code for a native access plan using one or more code generator functions corresponding to the operator.

In an embodiment, generating source code for the native access plan using one or more code generator functions corresponding to the parent class operator includes casting the operator as a type of the parent class operator and calling the one or more code generator functions from the casted operator. In this manner, the operator can be treated as the parent class operator simply by casting the operator as a parent class operator.

In an embodiment, source code for the native access plan is generated using one or more code generator functions corresponding to one or more derived class operators after having generated the source code corresponding to the parent operator. In an embodiment, compiler 166 generates the source code for the native access plan corresponding to one or more derived class operators.

At block 412, the source code for the native access plan is updated. In an embodiment, compiler 166 updates the source code for the native access plan by placing code generated by blocks 408 or 410 into the native access plan. Method 400 then proceeds to block 404.

At block 414, the intermediate representation code is generated from the native access plan. In an embodiment, intermediate representation code generator unit 168 generates the intermediate representation code from the native access plan created during method 400. Method 400 then proceeds to block 416, ends, and can return the generated intermediate representation code.

In an embodiment, execution unit 170 interprets or compiles the generated intermediate representation code to execute the query execution plan. Execution unit 170 can provide the results as query results 104.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for eliminating redundancy when generating intermediate representation code, comprising:
    traversing, by at least one processor, a query execution plan;
    for at least one operator in the query execution plan, determining, by the at least one processor, whether the operator is derived from a parent class operator;
    determining that the operator is derived from the parent class operator;
    generating, by the at least one processor, source code for a native access plan using one or more code generator functions corresponding to the parent class operator;
    casting the operator as a type of the parent class operator; and
    calling the one or more code generator functions from the casted operator.

2. The method of claim 1, the generating source code for the native access plan using one or more code generator functions corresponding to the operator further comprising:
    determining that one or more code generator functions of a child class operator of the operator has already generated some intermediate representation code for the operator; and
    generating additional source code for the native access plan for the operator that has not already been generated by the one or more code generator functions of the child class operator.

3. The method of claim 1, wherein the code generator functions are stored in a code generator context structure comprising at least one mutable data section and at least one immutable data section.

4. The method of claim 3, further comprising:
    generating constants in the source code for the native access plan from the at least one immutable data section.

5. The method of claim 1, wherein a change to the one or more code generator functions corresponding to the parent class operator does not require regeneration of source code for the native access plan generated by one or more code generator functions of a child class operator.

6. The method of claim 1, further comprising:
    converting the native access plan into intermediate representation code and native executable binary code for producing query results.

7. The method of claim 1, further comprising:
    based on a determination that the operator is not derived from the parent class operator, generating, by the at least one processor, source code for the native access plan using one or more code generator functions corresponding to the operator.

8. A system, comprising:
    a memory; and
    at least one processor coupled to the memory and configured to:
        traverse a query execution plan;
        for at least one operator in the query execution plan, determine whether the operator is derived from a parent class operator;
        determine that the operator is derived from the parent class operator;
        generate source code for a native access plan using one or more code generator functions corresponding to the parent class operator;
        cast the operator as a type of the parent class operator; and
        call the one or more code generator functions from the casted operator.

9. The system of claim 8, wherein to generate source code for the native access plan using one or more code generator functions corresponding to the operator, the at least one processor is configured to:
    determine that one or more code generator functions of a child class operator of the operator has already generated some source code for the native access plan for the operator; and
    generate additional source code for the native access plan for the operator that has not already been generated by the one or more code generator functions of the child class operator.

10. The system of claim 8, wherein the code generator functions are stored in a code generator context structure comprising at least one mutable data section and at least one immutable data section.

11. The system of claim 10, the at least one processor further configured to:
    generate constants in the source code for the native access plan from the at least one immutable data section.

12. The system of claim 8, wherein a change to the one or more code generator functions corresponding to the parent class operator does not require regeneration of source code for the native access plan generated by one or more code generator functions of a child class operator.

13. A tangible computer-readable device having instructions stored thereon that, when executed by at least one computing device, causes the at least one computing device to perform operations comprising:
- traversing a query execution plan;
- for at least one operator in the query execution plan, determining whether the operator is derived from a parent class operator;
- determining that the operator is derived from the parent class operator;
- generating source code for a native access plan using one or more code generator functions corresponding to the parent class operator;
- casting the operator as a type of the parent class operator; and
- calling the one or more code generator functions from the casted operator.

14. The computer-readable device of claim 13, the generating source code for the native access plan using one or more code generator functions corresponding to the operator comprising:
- determining that one or more code generator functions of a child class operator of the operator has already generated some source code for the native access plan for the operator; and
- generating additional source code for the native access plan for the operator that has not already been generated by the one or more code generator functions of the child class operator.

15. The computer-readable device of claim 13, wherein the code generator functions are stored in a code generator context structure comprising at least one mutable data section and at least one immutable data section.

16. The computer-readable device of claim 15, the operations further comprising:
- generating constants in the source code for the native access plan from the at least one immutable data section.

17. The computer-readable device of claim 15, the executing comprising:
- wherein a change to the one or more code generator functions corresponding to the parent class operator does not require regeneration of source code for the native access plan generated by one or more code generator functions of a child class operator.

* * * * *